United States Patent [19]

Dale

[11] 4,219,964
[45] Sep. 2, 1980

[54] ROPE WICK APPLICATOR

[75] Inventor: Jim E. Dale, Greenville, Miss.

[73] Assignee: The United States of America as represented by the Secretary of Agriculture, Washington, D.C.

[21] Appl. No.: 969,036

[22] Filed: Dec. 13, 1978

[51] Int. Cl.³ .......................................... A01M 21/00
[52] U.S. Cl. .......................................................... 47/1.5
[58] Field of Search ............................................. 47/1.5

[56] References Cited

U.S. PATENT DOCUMENTS

| 1,764,952 | 6/1930 | Hay | 47/1.5 |
| 2,311,782 | 2/1943 | Segars | 47/1.5 |
| 3,077,701 | 2/1963 | Osmun | 47/1.5 |

FOREIGN PATENT DOCUMENTS 2322538  4/1977  France ......................... 47/1.5

Primary Examiner—Robert E. Bagwill
Attorney, Agent, or Firm—M. Howard Silverstein; Raymond C. Von Bodungen; David G. McConnell

[57] ABSTRACT

A new apparatus and system for the systematic application of liquid chemicals to plants is disclosed. A soft woven nylon rope wick is used to convey chemical solution from a reservoir by means of capillary action. The rope apparatus, which is physically supported, is leveled and positioned to selectively contact certain plants as the wick is moved across an agricultural field. Thus chemical solution is deposited selectively only on contact with the wick.

5 Claims, 5 Drawing Figures

ROPE WICK APPLICATOR

BACKGROUND OF THE INVENTION

1. Field of the Invention

This invention relates to an apparatus which selectively applies agricultural liquid chemicals to plants.

2. Description of the Prior Art

In the prior art the literature teaches that herbicides are applied as sprays, in water or oil, or as dry granules. Basically, herbicides are applied by spraying over the top of plants or directed under the plant canopy toward the base of crop plants. When herbicides are sprayed on the soil before planting or emergence of crop plants, they may be either left on the soil surface or physically incorporated into the soil. Their characteristic phytotoxic properties may be altered by surfacants such as sticking and wetting agents added to their formulations or spray solutions, or by the kind of formulation used, such as granular formulation in place of an emulsifiable concentrate. Other techniques are known but seldom used in the art of applying herbicides. These include the injection of liquid or gaseous formulations directly into the soil with or without the use of an impervious shield, such as a plastic sheet to retain the vapors in the soil, and the use of bars of wax containing the herbicide to rub over the tops of plants.

SUMMARY OF THE INVENTION

The instant invention embodies a rope wick applicator to dispense liquid agricultural chemical solutions upon physical contact with foliage and plants. One end of a rope wick is inserted into agricultural chemical solutions contained in a reservoir. The other end of the rope wick entends out of the reservoir for a predetermined distance and is supported by a boom. The wick is thus brought into physical contact with the foliage or plants to be treated and the chemical is rubbed off of the wick onto the foliage and plants.

In another embodiment of the invention the boom and reservoir form the same structure. Wick segments are inserted through a plurality of holes along the surface of the reservoir-boom circumference. Rubber grommets hold the wick segments in place and prevent seepage of chemical solution from the reservoir-boom. The reservoir-boom is horizontally brought into contact with the foliage and plants to be treated so that chemical solution is rubbed off the wick onto the plants as physical contact is made. Since the reservoir-boom is rotatable, more or less wick contact can be made with the foliage or plants to be treated by rotating a larger or smaller amount of wick segments into the path of the foliage/plants.

The instant invention is unique in that a wick is used to convey the herbicide to its target in a manner similar to the movement of fuel to the flame of a kerosene lamp. The apparatus has no pump or moving parts. Placement of chemicals is more precise and efficient than is possible with any type of sprayer now in use. Air currents do not influence the distribution of chemicals or cause drift and polluting chemicals are not sprayed into the air or onto the soil.

The main objective of this invention is to build an applicator to increase the precision and efficiency of placement of agricultural chemicals on plants.

Another object of this invention is to reduce the pollution of air, soil, and water by placing the chemical directly onto the target plant itself rather than into the environment of the plant.

A third object of the invention is to eliminate the need for mechanical pumping systems.

A fourth object of the invention is to reduce the volume of water or oil carrier since the carriers often contain substances that are antagonistic and reduce the activity of agricultural chemicals.

A fifth object of this invention is to selectively place non-selective agricultural chemicals on different kinds of plants that may be growing together in the same place.

A sixth objective of this invention is to eliminate the waste of agricultural chemicals in non-target sinks.

Other objects and advantages of this invention will further become apparent hereinafter and in the drawings.

DESCRIPTION OF THE PREFERRED EMBODIMENTS

In referring to the preferred embodiments of the invention illustrated, specific terminology will be resorted to for the sake of clarity. However, it is not intended to be limited to the specific terms so selected, and it is understood that each specific term includes all technical equivalents which operate in a similar manner to accomplish a similar purpose.

Figure 1:
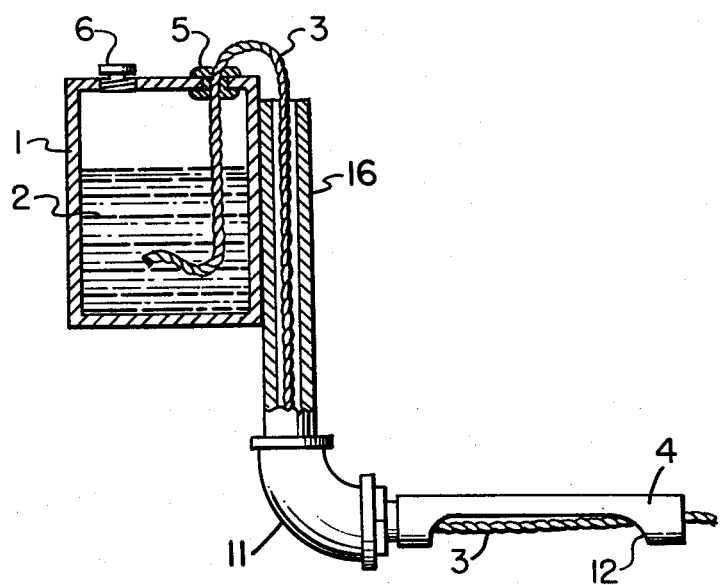
FIG. 1 is a side view of a wick applicator showing the component parts in relation to each other as typically assembled for application of agricultural chemicals below the crop canopy.

Turning now to the specific embodiments of the invention illustrated in the drawings where FIG. 1 shows a fluid reservoir 1 containing a liquid agricultural chemical 2 which is to be applied to some plant or foliage. Fluid reservoir 1 can be of any size, shape or material and is determined by the use to which it is to be subjected. The material must be compatible with the agricultural chemical to be dispensed. It may be metal, plastic, rubber, etc., but must be compatible with the agricultural chemical solution used. The size and shape is usually dictated by the means to which the apparatus is to be used. It must be of sufficient size and shape to endure movement over uneven terrain and not have to be subjected to frequent filling. In this embodiment of the instant invention the entire apparatus is moved by any convenient power source across a field at a predetermined ground speed selected to depend on conditions and plants or foliage to be treated. Environmental conditions and field conditions will be contributing factors as well as the type of foliage or plants to be treated.

One end of wick 3 extends down into reservoir 1 and is immersed in chemical fluid 2. Wick 3 is sufficiently long enough for the other end to extend out to the reservoir 1 for any predetermined distance necessary to physically contact the foliage or plants to be treated. Wick 3 can be of any material which is compatible with the agricultural chemical to be dispensed, and yet can efficiently wick up the chemical solution to be dispersed and distribute it throughout the surface area of wick 3 efficiently.

In the instant invention wick 3 material is manufactured by Wellington Puritan Mills, Madison, Georgia, described as being solid braid nylon rope G-1032 ½" in diameter, picks per inch 2.75 relax. Feet per pound 18.5, break strength 4,200 pounds. Woven from 32 ends of 840 denier multifiliment nylon yarn using 18 bobbins per carrier.

Figure 5:
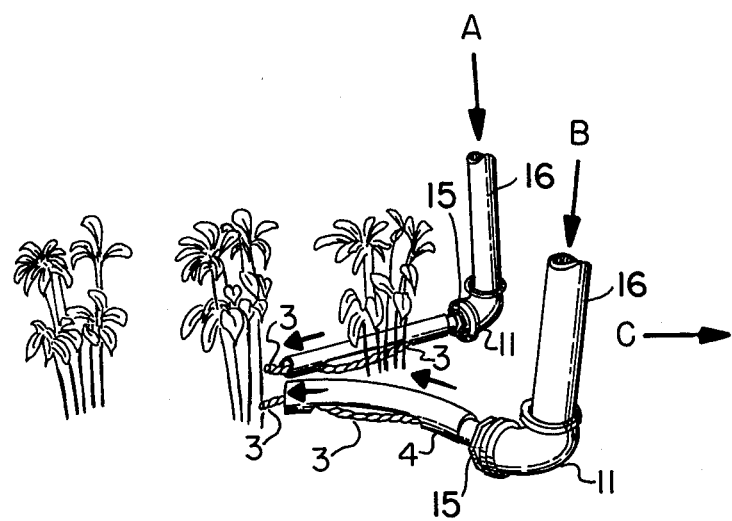
FIG. 5 shows one possible arrangement for treating drops using two of the instant apparatuses.

Wick 3 is supported by boom 4. Boom 4 is affixed to reservoir 1 and is designed to support wick 3 in a horizontal position over the entire working area. Therefore, support boom 4 takes off of the reservoir 1 in a vertical manner and is 90° elled out at the end of the vertical into a horizontal position. There are several critical parts to the design of the boom. Support 4 must be made of material which is compatible to the agricultural chemical to be dispersed. Secondly, boom 4 must be designed to fit around wick 3 but still leave sufficient working contact area open to expose wick 3 to contact with the foliage or plants to be treated. Thus, wick 3 is exposed to contact with the foliage or plants by means of slotting or openings in support boom 4 which will effectively bring wick 3 into efficient contact with the foliage or plants. It was found in the instant invention that a slightly less than ⅛ of the circumference of support of boom 4, which is constructed from 1" pipe, be removed as a slot 12. Thirdly 90° ell 11 must be designed with a rotating capability so that boom 4 may be rotated either in a horizontal plane for positioning or rotated about its longitudinal axis for exposure of more or less wicking surface area. Therefore, threaded nipple 15, FIG. 5, is provided to rotate boom 4 about its longitudinal axis. This is accomplished by either tightening or loosening threaded nipple 15. Ell 11 is also a threaded fitting. Boom 4 is rotated horizontally by either tightening or loosening threaded ell 11. 90° ell 11 must also be of compatible material to the agricultural solution to be dispensed. Thus, wick 3 is a continuous wick thoroughly immersed in chemical solution in reservoir 1 passing through upper support boom 16 out to a predetermined distance, and exposing a predetermined amount of wick surface area at the horizontal level of support boom 4 across slot 12.

As the apparatus moves across the field to be treated, plants strike the exposed part of the moist softwoven nylon rope wick 3 held and supported by support boom 4 along the horizontal section. Chemical solution 2, that moistens wick 3, is wiped on the plants or foliage as they come into contact with wick 3 at the proper predetermined height. As agricultural chemical solution 2 is wiped from wick 3 onto the foliage or plants to be treated, it is replenished by capillary movement and gravitational flow from reservoir 1 through wick 3 to the exposed part of wick 3. Wick 3 is held in reservoir 1 by a rubber grommet 5 which also prevents spillage. More solution is added to reservoir as needed by removing fill cap 6 and adding.

FIG. 5 shows arrangement for treating crops, wherein two apparatuses are rigged to treat opposing sides of a row of agricultural crops. Chemical solution is wicked through (as shown by arrows A & B) as the apparatus is moved forward (as shown by arrow C). Of course other arrangements are possible such as treating more than one row of agricultural crops at a time, treating crops above and below the canopy, treating weeds along a highway, etc. which would require variations to the arrangement shown. In FIG. 5, the exposed or slotted portion of boom 4 where slot 12 occurs is on the inside surface of boom 4.

EXAMPLE 1

The embodiment as described in FIG. 1, for a typical application of herbicides to control weeds beneath a crop canopy, would be mounted on a tool bar attached to a tractor. The tool bar could be on the front of the tractor, beneath it, or on the rear. Two devices are needed for each crop row and these are mounted on the tool bar on opposite sides of the row with the horizontal booms pointing inward toward the row. The gap between the end of the booms is adjusted to center on the row and as the pair of devices is moved along a row the booms sweep along beneath the crop canopy, and herbicide from the saturated wicks is rubbed on weeds growing there.

The gap between the boom tips must be adjusted to avoid contacting crop plants (normally a 2–4 inch gap is needed) just as the space between plows is adjusted to avoid plowing up crops during cultivation. Also the position of the booms must be adjusted to a height that will avoid contact with the soil yet still contact low growing weeds. Normally a 1" height above the soil would be maintained by guage wheels mounted on the tool bar.

Glyphosate [N-(phosphonomethyl)glycine] (trade name Roundup), a systemic herbicide that controls most broad leaf and grass weeds has been applied with this device to control weeds in soybeans and this will be used as an example of how the device is used. But the application of other herbicides in different crops can also be cited. After mounting and adjusting the pairs of devices a solution of glyphosate and water (1:2 Roundup:water;v/v) is mixed and poured into the reservoir. Although other proportions of herbicide and water have been used these proportions were most effective. The wicks are saturated and ready for use in approximately twenty minutes. As a tractor is driven down crop rows herbicide is wiped onto the weeds that contact the wick. Normally, the speed used in cultivation (2–3 mph) would be the preferred speed for herbicide applicaton with this device. Although weeds have been controlled effectively at 8 mph it is more difficult to avoid injuring crop plants at higher speeds. The number of rows treated in one trip across the field depends on the length of tool bar and the number of applicators used. A four row rig with one quart reservoirs for each applicator will treat approximately 400 acres per filling assuming a ground speed of 2½ mph. Although one application of the herbicide will kill most weeds contained, the number of applications required per season will depend on weather conditions, intensity of weed infestation and other factors.

Figure 2:
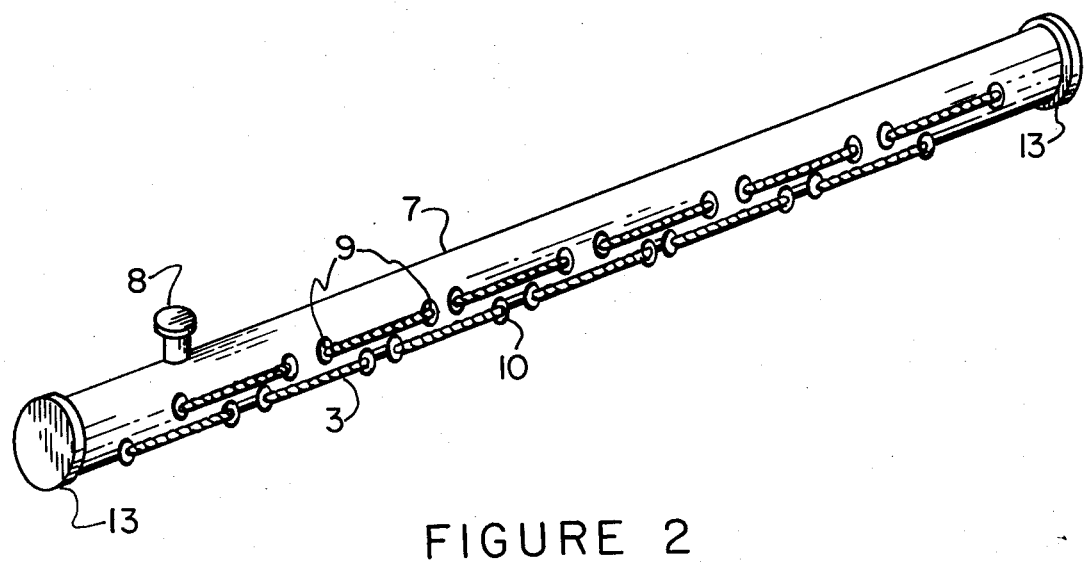
FIG. 2 is a side view of a wick applicator showing an external view of the component parts of the apparatus constructed for application of agricultural chemicals to plants growing taller than the crop canopy.

In the specific embodiment of the invention illustrated in FIG. 2, 7 represents a reservoir-boom arrangement which is made from aluminum pipe and is moved in a horizontal position across the field by any convenient power source. The attachment arrangement to the power source is not important, only that it be moved horizontally across the agricultural field at a predetermined speed and direction. As plants are struck by the exposed portion of wick 3 chemical solution 2 is wiped from wick 3 onto the foliage of plants to be treated.

Figure 3:
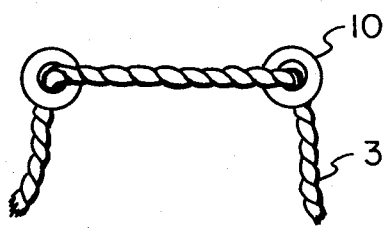
FIG. 3 is an expanded view of one of the component wicks showing details of construction.
Figure 4:
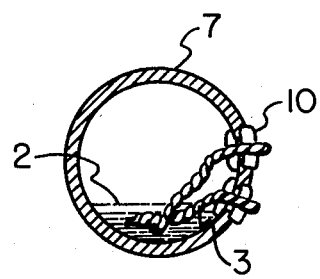
FIG. 4 is a cross-section of the apparatus in FIG. 2 showing the internal arrangement of parts.

Reservoir-boom 7 is filled with agricultural chemical solution 2 for treating plants or foliage. Ends of reservoir-boom 7 are closed with caps 13. Wick 3 can be of any length but will usually be determined by the spacing of a plurality of holes 9 which are ⅜″ in diameter in the instant invention and spaced along the outer circumference of the reservoir-boom. FIG. 3 shows an individual segment of wick 3. One end of wick 3 is fed through a hole 9 in reservoir-boom 7 and the other end is fed through the next horizontal hole 9 in reservoir-boom 7 (see FIGS. 2 and 3). Thus the ends of wick 3 are thoroughly immersed in chemical solution 2, (see FIG. 4), contained in the body of the reservoir-boom 7. Additional chemical solution 2 can be added as needed to the body of reservoir-boom 7 through fill cap 8. (See FIG. 2). Rubber grommets 10 hold the segments of wick 3 in holes 9 as well as preventing spillage or seeping of chemical solution from the reservoir-boom 7. The quantity of chemical solution dispensed per unit area of field treated is dependent on the number of contacts of the solution laden wick with plants growing in the path of reservoir-boom 7 moving across the field. Ordinarily reservoir-boom 7 is clamped in a position so that wick 3 is facing toward the plants encountered as the apparatus is moved across the field, however, where dense plant cover is encountered the flow of chemical solution from reservoir-boom 7 to the external portion of wick 3 can be increased by rotating the reservoir-boom 7 about its longitudial axis so that more of wick 3's are on the bottom of the boom and come into contact with the foliage or plants. It should be understood that the number and length of wick 3 segments will determine the amount of agricultural chemical solution and concentration of solution dispensed on the foliage, the number and spacing of holes 9, and will also determine the amount of treatment administered to the plants or foliage.

Water is used as a solvent in the chemical solution in the instant invention because it is readily available, although other specific solvents could be used for various chemicals not readily soluble in water. Softwoven nylon rope is used as a wick because it has the capacity to move chemicals dissolved in water by capillary action, and is inert to most agricultural chemicals. Wicks made of other man-made or natural fibers can also be used, although a nylon wick is preferred in the instant invention because the fibers are mechanically strong, have the desired affinity for aqueous solutions, and are inert to agricultural chemicals. The reservoir and support boom are steel or aluminum, but other materials may be equally satisfactory.

EXAMPLE 2

In the case of tall weeds such as johnsongrass growing above soybeans the embodiment as described in FIG. 2 has been used to apply glyphosate. The device can be mounted in front or behind the tractor but front mounting is preferred. The device is adjusted vertically to pass over the top of the crop plants but to contact as much of the weeds as possible as the device is moved across the field. Approximately 10 minutes are required for a 1:2 mixture of Roundup and water to saturate the wicks after filling. A speed of 2 to 4 mph is preferred although faster or slower speeds have been used with good results.

The number of acres treated per gallon of herbicide solution used will vary with the number and size of weeds treated but in practice 90–200 acres have been treated with one gallon of the herbicide. Two applications three weeks apart in comparison to a single application has resulted in better johnsongrass control (89–97% vs 40–73%).

I claim:

1. A rope wick applicator to dispense liquid agricultural chemical solution upon physical contact with foliage and plants comprising:
    (a) reservoir containing agricultural chemical solution;
    (b) a rope wick with one end extending down into the reservoir and immersed into said chemical solution, and the other end sufficiently long enough to extend out of the reservoir for a predetermined distance necessary to contact the foliage and plants to be treated;
    (c) a rigid support boom supporting said rope wick, said rigid boom affixed to the reservoir, and comprising a vertical take off from said reservoir; a 90° ell at the end of the vertical take off and a horizontal slotted working section which will permit the wick to contact the foliage and plants to be treated;
    (d) a means for filling and refilling said reservoir with liquid agricultural chemical solution.

2. The rope wick applicator of claim 1 wherein the 90° ell is threaded on both ends and therefore the boom and ell is rotatable in the horizontal plane as well as about its longitudinal axis.

3. The rope wick applicator of claim 2 constructed of materials which are compatible with the liquid agricultural solution.

4. The rope wick applicator of cliam 1 wherein the wick is of soft woven nylon rope.

5. The rope wick applicator of claim 1 wherein the slotted portion is slightly less than ½ of the circumference of the support boom which is constructed from 1″ pipe.

* * * * *